United States Patent
Dowski, Jr.

(10) Patent No.: US 6,873,733 B2
(45) Date of Patent: Mar. 29, 2005

(54) COMBINED WAVEFRONT CODING AND AMPLITUDE CONTRAST IMAGING SYSTEMS

(75) Inventor: Edward Raymond Dowski, Jr., Lafayette, CO (US)

(73) Assignee: The Regents of the University of Colorado, Boulder, CO (US)

(*) Notice: Subject to any disclaimer, the term of this patent is extended or adjusted under 35 U.S.C. 154(b) by 480 days.

(21) Appl. No.: 09/766,325

(22) Filed: Jan. 19, 2001

(65) Prior Publication Data

US 2002/0196980 A1 Dec. 26, 2002

(51) Int. Cl.⁷ ................................................. G06K 9/36
(52) U.S. Cl. ..................... 382/232; 382/255; 382/276; 382/283; 250/201.2; 359/16
(58) Field of Search .......................... 382/106, 211, 382/214, 232, 255, 274, 276, 283; 250/201.2, 201.4, 201.9; 356/124.5; 359/16, 279, 319

(56) References Cited

U.S. PATENT DOCUMENTS

| | | | |
|---|---|---|---|
| 2,959,105 A | 11/1960 | Sayanagi ........................ 430/4 |
| 3,054,898 A | 9/1962 | Westover et al. ........... 250/348 |
| 3,305,294 A | 2/1967 | Alvarez ........................ 351/169 |
| 3,583,790 A | 6/1971 | Baker .......................... 359/676 |
| 3,614,310 A | 10/1971 | Korpel ......................... 348/625 |
| 3,856,400 A | 12/1974 | Hartmann et al. ............. 356/28 |
| 3,873,958 A | 3/1975 | Whitehouse ................ 367/126 |
| 4,062,619 A | 12/1977 | Hoffman ..................... 359/370 |
| 4,082,431 A | 4/1978 | Ward, III ..................... 359/15 |
| 4,174,885 A | 11/1979 | Joseph et al. ................. 359/15 |
| 4,178,090 A | 12/1979 | Marks et al. ................ 396/331 |
| 4,255,014 A | 3/1981 | Ellis ........................... 359/371 |
| 4,275,454 A | 6/1981 | Klooster, Jr. ................ 708/821 |
| 4,276,620 A | 6/1981 | Kahn et al. .................... 367/60 |
| 4,308,521 A | 12/1981 | Casasent et al. ............ 382/254 |
| 4,349,277 A | 9/1982 | Mundy et al. ............... 356/604 |
| 4,466,067 A | 8/1984 | Fontana ...................... 701/300 |
| 4,480,896 A | 11/1984 | Kubo et al. ................. 359/707 |
| 4,573,191 A | 2/1986 | Kidode et al. .............. 382/106 |

(Continued)

FOREIGN PATENT DOCUMENTS

| | | |
|---|---|---|
| EP | 0531926 B1 | 3/1993 |
| EP | 0584769 B1 | 3/1994 |
| EP | 0618473 A2 | 10/1994 |
| EP | 0742466 A2 | 11/1996 |
| EP | 0759573 A2 | 2/1997 |
| EP | 0791846 A2 | 8/1997 |
| EP | 0981245 A2 | 2/2000 |
| GB | 2278750 A | 12/1994 |
| JP | 2000-98301 A | 4/2000 |
| WO | WO 99/57599 | 11/1999 |
| WO | WO 00/52516 A | 9/2000 |

OTHER PUBLICATIONS

J. Ojeda–Castaneda, L. R. Berriel–Valdos, and E. Montes, "Spatial filter for increasing the depth of focus", Optics Letters, vol. 10, No. 11, p520–522, Nov., 1985.

(Continued)

Primary Examiner—Daniel Miriam
(74) Attorney, Agent, or Firm—Lathrop & Gage, LC

(57) ABSTRACT

The present invention provides extended depth of field or focus to conventional Amplitude Contrast imaging systems. This is accomplished by including a Wavefront Coding mask in the system to apply phase variations to the wavefront transmitted by the Phase Object being imaged. The phase variations induced by the Wavefront Coding mask code the wavefront and cause the optical transfer function to remain essentially constant within some range away from the in-focus position. This provides a coded image at the detector. Post processing decodes this coded image, resulting in an in-focus image over an increased depth of field.

5 Claims, 10 Drawing Sheets

U.S. PATENT DOCUMENTS

| | | | |
|---|---|---|---|
| 4,575,193 A | 3/1986 | Greivenkamp, Jr. | 359/495 |
| 4,580,882 A | 4/1986 | Nuchman et al. | 351/161 |
| 4,589,770 A | 5/1986 | Jones et al. | 356/3.14 |
| 4,642,112 A | 2/1987 | Freeman | 623/6.3 |
| 4,650,292 A | 3/1987 | Baker et al. | 359/720 |
| 4,655,565 A | 4/1987 | Freeman | 351/159 |
| 4,725,881 A | 2/1988 | Buchwald | 348/237 |
| 4,734,702 A | 3/1988 | Kaplan | 342/424 |
| 4,794,550 A | 12/1988 | Greivenkamp, Jr. | 702/167 |
| 4,804,249 A | 2/1989 | Reynolds et al. | 359/721 |
| 4,825,263 A | 4/1989 | Desjardins et al. | 356/603 |
| 4,827,125 A | 5/1989 | Goldstein | 250/234 |
| 4,843,631 A | 6/1989 | Steinpichler et al. | 382/280 |
| 4,936,661 A | 6/1990 | Betensky et al. | 359/692 |
| 4,964,707 A | 10/1990 | Hayashi | 359/371 |
| 4,989,959 A | 2/1991 | Plummer | 359/640 |
| 5,003,166 A | 3/1991 | Girod | 250/201.4 |
| 5,076,687 A | 12/1991 | Adelson | 356/4.04 |
| 5,102,223 A | 4/1992 | Uesugi et al. | 356/607 |
| 5,128,874 A | 7/1992 | Bhanu et al. | 701/301 |
| 5,142,413 A | 8/1992 | Kelly | 359/559 |
| 5,165,063 A | 11/1992 | Strater et al. | 356/4.01 |
| 5,166,818 A | 11/1992 | Chase et al. | 398/201 |
| 5,193,124 A | 3/1993 | Subbarao | 382/255 |
| 5,218,471 A | 6/1993 | Swanson et al. | 359/565 |
| 5,243,351 A | 9/1993 | Rafanelli et al. | 342/351 |
| 5,248,876 A | 9/1993 | Kerstens et al. | 250/559.05 |
| 5,260,727 A | 11/1993 | Oksman et al. | 359/162 |
| 5,270,825 A | 12/1993 | Takasugi et al. | 348/359 |
| 5,270,861 A | 12/1993 | Estelle | 359/676 |
| 5,270,867 A | 12/1993 | Estelle | 359/692 |
| 5,280,388 A | 1/1994 | Okayama | 359/569 |
| 5,299,275 A | 3/1994 | Jackson et al. | 385/116 |
| 5,301,241 A | 4/1994 | Kirk | 382/166 |
| 5,307,175 A | 4/1994 | Seachman | 358/401 |
| 5,317,394 A | 5/1994 | Hale et al. | 348/207.99 |
| 5,337,181 A | 8/1994 | Kelly | 359/574 |
| 5,426,521 A | 6/1995 | Chen et al. | 359/9 |
| 5,438,366 A | 8/1995 | Jackson et al. | 348/342 |
| 5,442,394 A | 8/1995 | Lee | 348/264 |
| 5,444,574 A | 8/1995 | Ono et al. | 359/708 |
| 5,465,147 A | 11/1995 | Swanson | 356/497 |
| 5,473,473 A | 12/1995 | Estelle et al. | 359/691 |
| 5,476,515 A | 12/1995 | Kelman et al. | 623/6.59 |
| 5,521,695 A | 5/1996 | Cathey, Jr. et al. | 356/4.01 |
| 5,532,742 A | 7/1996 | Kusaka et al. | 348/264 |
| 5,555,129 A | 9/1996 | Konno et al. | 359/569 |
| 5,565,668 A | 10/1996 | Reddersen et al. | 235/462.22 |
| 5,568,197 A | 10/1996 | Hamano | 348/342 |
| 5,572,359 A | 11/1996 | Otaki et al. | 359/386 |
| 5,610,684 A | 3/1997 | Shiraishi | 355/55 |
| 5,640,206 A | 6/1997 | Kinoshita et al. | 348/264 |
| 5,706,139 A | 1/1998 | Kelly | 359/737 |
| 5,748,371 A * | 5/1998 | Cathey et al. | 359/558 |
| 5,751,475 A | 5/1998 | Ishiwata et al. | 359/387 |
| 5,756,981 A | 5/1998 | Roustaei et al. | 235/462.42 |
| 5,969,853 A | 10/1999 | Takaoka | 359/370 |
| 5,969,855 A | 10/1999 | Ishiwata et al. | 359/386 |
| 6,011,874 A * | 1/2000 | Gluckstad | 382/276 |
| 6,025,873 A | 2/2000 | Nishioka et al. | 348/72 |
| 6,034,814 A | 3/2000 | Otaki | 359/371 |
| 6,037,579 A | 3/2000 | Chan et al. | 250/216 |
| 6,091,548 A | 7/2000 | Chen | 359/637 |
| 6,097,856 A | 8/2000 | Hammond, Jr. | 382/312 |
| 6,121,603 A | 9/2000 | Hang et al. | 250/216 |
| 6,128,127 A | 10/2000 | Kusaka | 359/371 |
| 6,144,493 A | 11/2000 | Okuyama et al. | 359/566 |
| 6,172,723 B1 | 1/2001 | Inoue et al. | 349/95 |
| 6,172,799 B1 | 1/2001 | Raj | 359/305 |
| 6,262,818 B1 * | 7/2001 | Cuche et al. | 359/9 |

OTHER PUBLICATIONS

J. Ojeda–Castaneda, and A. Diaz, "High focal depth by quasibifocus", vol. 27, No. 20, p4163–4165, Oct. 15, 1988.

J. Ojeda–Castaneda, E. Tepichin, and A. Pons, "Apodization of annular apertures: Strehl ratio", Applied Optics, vol. 27, No. 24, p 5140–5145, Dec. 15, 1988.

D. L. Marks, R. A. Stack, D. J. Brady, and J. Van Der Gracht, "Three–dimensional tomography using a cubic–phase plate extended depth–of–field system", Optics Letters, vol. 24, No. 4, p 253–255, Feb. 15, 1999.

S. C. Tucker, W. T. Cathey, and E. R. Dowski, Jr, "Extended depth of field and aberration control for inexpensive digital microscope systems", Optics Express, vol. 4, No. 11, p467–474, May 24, 1999.

H. Bartelt, J. Ojeda–Castaneda, and E. E. Sicre, "Misfocus tolerance seen by simple inspection of the ambiguity function", Applied Optics, vol. 23, No. 16, p 2693–2696, Aug. 15, 1984.

J. Ojeda–Castaneda, L. R. Berriel–Valdos, and E. Montes, "Ambiguity function as a design tool for high focal depth", Applied Optics, vol. 27, No. 4, p 790–795, Feb. 15, 1988.

J. Ojeda–Castaneda, P. Andres, and A. Diaz, "Annular apodizers for low sensitivity to defocus and to spherical aberration", Optics Letters, vol. 11, No. 8, p 487–489, Aug., 1986.

J. Ojeda–Castaneda, E. Tepichin, and A. Diaz, "Arbitrarily high focal depth with a quasioptimum real and positive transmittance apodizer", Applied Optics, vol. 28, No. 13, p 2666–2670, Jul. 1, 1989.

J. Ojeda–Castaneda, and L. R. Berriel–Valdos, "Arbitrarily high focal depth with finite apertures", Optics Letters, vol. 13, No. 3, p 183–185, Mar., 1988.

G. Indebetouw, and H. Bai, "Imaging with Fresnel zone pupil masks: extended depth of field", Applied Optics, vol. 23, No. 23, p 4299–4302, Dec. 1, 1984.

W. T. Welford, "Use of annular apertures to increase focal depth", Journal of the Optical Society of America, vol. 50, No. 8, p 749–753, Aug., 1960.

C. Varamit, and G. Indebetouw, "Imaging properties of defocused partitioned pupils", J. Opt. Soc. Am. A, vol. 2, No. 6, p 799–802, Jun. 1985.

E. R. Dowski Jr., and W. T. Cathey, "Single lens single–image incoherent passive–ranging systems", Applied Optics, vol. 33, No. 29, p 6762–6773, Oct. 10, 1994.

W. T. Cathey, B. R. Frieden, W. T. Rhodes, and C. K. Rushforth, "Image gathering and processing for enhanced resolution", J. Opt. Soc. Am. A, vol. 1, No. 3, p 241–250, Mar. 1984.

J. Van Der Gracht, E. R. Dowski Jr., M. G. Taylor, and D. M. Deaver, "Broadband behavior of an optical–digital focus–invariant system", Optics Letters, vol. 21, No. 13, p 919–921, Jul. 1, 1996.

G. Hausler, "A method to increase the depth of focus by two step image processing", Optical Communications, vol. 6, No. 1, p 38–42, Sep., 1972.

C. J Cogswell, N. I. Smith, K. G. Larkin, and P. Hariharan, "Quantitative DIC microscopy using a geometric phase shifter", SPIE, vol. 2984, p72–81,1997.

D. Kermisch, "Partially coherent image processing by laser scanning", Journal of the Optical Society of America, vol. 65, No. 8, p 887–891, Aug., 1975.

R. J. Pieper and A. Korpel, "Image processing for extended depth of field", Applied Optics, vol. 22, No. 10, p 1449–1453, May 15, 1983.

G. E. Johnson, E. R. Dowski, Jr, and W. T. Cathey, "Passive ranging through wave–front coding: information and application", Applied Optics, vol. 39, No. 11, p 1700–1710, Apr. 10, 2000.

G. Y. Sirat, "Conoscopic holography. I. Basic principles and physical basis", J. Opt. Soc. Am. A, vol. 9, No. 1, p 70–90, Jan. 1992.

E. R. Dowski, Jr, and W. T. Cathey, "Extended depth of field through wave–front coding", Applied Optics, vol. 34, No. 11, p 1859–1866, Apr. 10, 1995.

H. B. Wach, E. R. Dowski,Jr., and W. T. Cathey, "Control of chromatic focal shift through wave–front coding", Applied Optics, vol. 37, No. 23, p 5359–5367, Aug. 10, 1998.

D. Kermisch, "Principle of equivalence between scanning and conventional optical imaging systems", J. Opt. Soc. Am, vol. 67, No. 10, p 1357–1360, Oct., 1977.

J. Ojeda–Castaneda, R. Ramos and A. Noyola–Isgleas, "High focal depth by apodization and digital restoration", Applied Optics, vol. 27, No. 12, p 2583–2586, Jun. 15, 1988.

J. Ojeda–Castaneda, and L. R. Berriel–Valdos, "Zone plate for arbitrarily high focal depth", Applied Optics, vol. 29, No. 7, p 994–997, Mar. 1, 1990.

J.T. McCrickerd, "Coherent processing and depth of focus of annular aperture imagery", Applied Optics, vol. 10, No. 10, p2226–2230, Oct., 1971.

M.Mino and Y. Okano, "Improvement in the OTF of a defocused optical system through the use of shade apertures", Applied Optics, vol. 10, No. 10, p2219–2225, Oct., 1971.

S. Kubo, M. Inui, and Y. Miyake, "Preferred sharpness of photographic color images", Journal of Imaging Science, vol. 29,No. 6, p213–215, Nov./Dec. 1985.

C. J. Cogswell and C. J. R. Sheppard, "Confocal differential interference contrast (DIC) microscopy: including a theoretical analysis of conventional and confocal DIC imaging", Journal of Microscopy, vol. 165, part 1, p 81–101, Jan., 1992.

J. M. Schmitt, S. L. Lee and K. M. Yung, "An optical coherence microscope with enhanced resolving power in thick tissue", Optics Communications, vol. 142, p 203–207, Oct. 15, 1997.

K. J. Barnard, E. A. Watson and P. F. McManamon, "Non-mechanical microscanning using optical space–fed phased arrays", Optical Engineering, vol. 33, No. 9, p 3063–3071, Sep., 1994.

W. T. Cathey and W. C. Davis, "Imaging system with range to each pixel", J Opt. Soc. Am A, vol. 3, No. 9, p1537–1542, Sep., 1986.

J. E. Greivenkamp, "Color dependent optical prefilter for the suppression of aliasing artifacts", Applied Optics, vol. 29, No. 5, p 676–684, Feb. 10, 1990.

J. T. McCrickerd, "Coherent processing and depth of focus of annular aperture imagery", Applied Optics, vol. 10, No. 10, p 2226–2230, Oct., 1971.

M. Kawakita, K. Iizuka, T. Aida, H. Kikuchi, H. Fujikake, J. Yonai and K. Takizawa, "Axi–version camera: a three–dimension camera", In Three–dimensional Image Capture and Applications III, Brian D. Corner, Joseph H. Nurre, Editors, Proceedings of SPIE, vol. 3958, p 61–70, 2000.

C. Wust and D. W. Capson, "Surface profile measurement using color fringe projection", Machine Vision and Applications, vol. 4, p 193–203, 1991.

S. V. Shatalin, J. B. Tan, R. Juskaitis and T. Wilson, "Polarization contrast imaging of thin films in scanning miroscopy", Optics Communications, vol. 116, p 291–299, May 1, 1995.

T. Fukano, "Geometrical cross–sectional imaging by a heterodyne wavelength–scanning interference confocal microscope", Optics Letters, vol. 25, No. 8, p 548–550, Apr. 15, 2000.

Q–S. Chen and M. S. Weinhous, "Sub–pixel shift with fourier transformation to achieve efficient and high quality image interpolation", SPIE, vol. 2, No. 3661, p 728–736, Feb. 1999.

H. Wei, and T. D. Binnie, "High–resolution image reconstruction for multiple low–resolution images", 7th International Conference on Image Processing and Its Applications, Pub. # 465, vol. 2 p596–600 (1999).

G. Hausler, and E. Korner, "Imaging with expanded depth of focus", Zeiss Inform, Oberkochen, 29, No. 98E, p 9–13 (1986/1987).

Hecht, Eugene, *Optics*, Second Edition, 1987, pp. 177–181.

Veldkamp, Wilfrid B., and McHugh, Thomas J., "Binary Optics", Scientific American, May 1, 1992, vol. 266, No. 5, pp. 50–55.

O'Shea, Donald C. and Harrigan, Michael E., "Chapter 33, Aberration Curves in Lens Design", Handbook of Optics, vol. 1, 1995, pp. 33.1–33.5, McGraw–Hill, New York.

Abstract of JP 60247611 A, published Jul. 12, 1985 (Toshiba KK), Patent Abstracts of Japan, May 6, 1986, vol. 010, No. 119 (p–435), 1 page.

Siebert, J. (Officer), Copy of the International Search Report for PCT/US01/26126, Int'l filing date Aug. 20, 2001, completed Jun. 24, 2003, 3 pages.

Poon, Ting–Chung and Motamedi, Masoud, "Optical/digital incoherent image processing for extended depth of field", Applied Optics vol. 26, No. 21, Nov. 1, 1987, pp. 4612–4615.

Bradburn, Sarah, Cathey, Wade Thomas and Dowski, Edward R., Jr., "Realizations of focus invariance in optical–digital systems with wave–front coding", Applied Optics vol. 36, No. 35, Dec. 10, 1997, pp. 9157–9166.

Van Der Gracht, Joseph, Dowski, Edward R., Jr., Cathey, W. Thomas and Bowen, John P., "Aspherical optical elements for extended deptho fo filed imaging,", SPIE vol. 2537, pp. 279–288.

* cited by examiner

Top row:
40X Hoffman
Modulation Contrast
Imaging

Bottom row:
Wavefront Coded 40X
Hoffman Modulation
Contrast Imaging

COMBINED WAVEFRONT CODING AND AMPLITUDE CONTRAST IMAGING SYSTEMS

CROSS-REFERENCE TO RELATED APPLICATIONS

U.S. Pat. No. 5,748,371, issued May 5, 1998 and entitled "Extended Depth of Field Optical Systems," is incorporated herein by reference.

BACKGROUND OF THE INVENTION

1. Field of the Invention

This invention relates to apparatus and methods for improving contrast imaging of objects which are transparent or reflective, and also vary in thickness or index of refraction, using wavefront coding.

2. Description of the Prior Art

Most imaging systems generate image contrast through variations in reflectance or absorption of the object being viewed. Objects that are transparent or reflective but have variations in thickness can be very difficult to image because the majority of the image contrast typically is derived from variations in the reflectance or absorption of the object. These types of objects can be considered "Phase Objects". Various techniques have been developed over the years to produce high-contrast images from phase objects. These techniques allow high contrast images from essentially transparent objects that have only variations in thickness or index of refraction. These techniques generally modify both the illumination optics and the imaging optics and are different modes of what can be called "Contrast Imaging".

There are a number of different Contrast Imaging techniques that have been developed over the years to image phase objects. These techniques can be grouped into three classes that are dependent on the type of modification made near the back focal plane of the imaging objective and the type of illumination method used. The simplest contrast imaging techniques modify the back focal plane of the imaging objective with an intensity or amplitude mask. Other techniques modify the back focal plane of the objective with phase masks. Still more techniques require the use of polarized illumination and polarization-sensitive beam splitters and shearing devices. In all of these contrast-imaging techniques modifications to the illumination system are matched to the modifications of the imaging optics.

Contrast Imaging techniques that require amplitude modification of the back focal plane of the imaging objectives we call "Amplitude Contrast" techniques. These techniques include Hoffman modulation contrast imaging (described in U.S. Pat. No. 4,062,619), edge enhancement of phase phenomena (described in U.S. Pat. No. 4,255,014), and the VAREL imaging techniques by Carl Zeiss.

FIG. 1 (Prior Art) is a block diagram 100, which shows generally how Amplitude Contrast Imaging techniques are implemented. This block diagram shows imaging an object 108 through transmission, but those skilled in the art will appreciate that the elements could just as simply have been arranged to show imaging through reflection.

Illumination source 102 and illumination optics 104 act to produce focussed light upon Phase Object 108. A Phase Object is defined here as an object that is transparent or reflective but has variations in thickness or index of refraction, and thus can be difficult to image because the majority of the image contrast typically is derived from variations in the reflectance or absorption of the object. Obviously almost any real life object is strictly speaking a Phase Object, but only objects having enough thickness or index of refraction variation to be difficult to image will require special imaging techniques.

Objective lens 110 and tube lens 114 act to produce an image 118 upon detector 120. Detector 120 can be film, a CCD detector array, a CMOS detector, etc. The various amplitude contrast techniques differ in the form of illumination mask 106 and objective mask 112. Traditional imaging, such as bright field imaging, would result if neither an illumination mask nor an objective mask were used.

FIG. 2 (Prior Art) shows a first embodiment of an illumination, mask 106a and an objective mask 112a, constructed and arranged for Hoffman modulation Contrast Imaging. Illumination mask 106a consists of two slits 202, 204 that are narrow in comparison to the diameter of the condenser aperture. Slit 204 has nearly 100% transmittance. Slit 202 contains a polarizer, and when an adjustable polarizer (not shown) is placed in the illumination path, the effect is to make this slit have a variable transmittance. When the adjustable and slit polarizers are adjusted to give extinction, the effective transmittance of this second slit is zero. In the opposite polarization configuration the effective transmittance is 100%.

Objective mask 112a is essentially the conjugate of illumination mask 106a. Objective mask 112a consists of small regions 206, 208 of absorptive power with the remainder 210 of the mask having 100% transmittance. In operation, the light that travels through illumination slits 202, 204 that is not significantly diffracted from object 108 (as for example when a phase gradient is not present) is severely attenuated by objective mask blocks 206, 208. The light that is diffracted by object 108 passes mainly through the transparent region 210 of the objective mask. In this way Hoffman modulation contrast imaging converts phase differences in the object into intensity differences in the formed images.

FIG. 3 (Prior Art) shows illumination mask 106b and objective mask 112b set for Carl Zeiss VAREL contrast imaging. Illumination mask 106b consists of an annulus 302 with 100% transmission on a fully absorptive field 304. Objective mask 112b consists of a matching partially absorptive annulus 306 on a transparent field 308. Light that passes through illumination mask 106b and is not diffracted by object 108 is severely attenuated by objective mask 112b. Light that is diffracted by object 108 passes mainly through the center of objective mask 308 unattenuated. In this way VAREL contrast imaging converts phase differences in the object into intensity differences in the formed images.

Although Amplitude Contrast Imaging techniques effectively produce high contrast images of Phase Objects, these techniques do not allow a large depth of field or control of general focus-related aberrations. A large depth of field is important when imaging objects that have a depth that is large in relation to the depth of field of the system or when making a very low cost imaging system.

There is a need to improve Contrast Imaging of Phase Objects by increasing depth of field and controlling focus-related aberrations.

SUMMARY OF THE INVENTION

An object of the present invention is to improve Contrast Imaging of phase objects by increasing depth of field and controlling focus-related aberrations. This is accomplished by combining Contrast Imaging apparatus and methods with Wavefront Coding and post processing to increase depth of field and reduce misfocus effects.

Wavefront Coding can be used in conjunction with amplitude contrast imaging techniques to produce systems that have both a large depth of field and high contrast imaging of phase objects. The general amplitude contrast imaging system is modified with a special purpose generalized aspheric optical element and image processing of the detected image to form the final image. Unlike the traditional imaging system, the final image using Wavefront Coding is not directly available at the image plane. Post processing of the detected image is required. The Wavefront Coding optical element can be fabricated as a separate component, can be combined with the objective mask, or can be constructed as an integral component of the imaging objective or tube lens.

A Wavefront Coding optical element can also be used on the illumination side of the system in order to extended the depth of field of the projected illumination due to the duality of projection and imaging. This projected illumination would be broader than without Wavefront Coding, but the optical density as a function of distance from the object would be less sensitive with Wavefront Coding than without. Without Wavefront Coding on the illumination side of the system at some point and object can technically be imaged clearly but is not illuminated sufficiently. See "Principal of Equivalence between Scanning and Conventional Optical Imaging Systems", Dorian Kermisch, J. Opt. Soc. Am., Vol. 67, no. 10, pp.,1357–1360(1977).

The component of importance for the Wavefront Coding imaging optics and digital processing in amplitude contrast systems is the objective mask, as opposed to the illumination mask. Without the objective mask the imaging side of the system (as opposed to the illumination side) is a traditional imaging system. The illumination mask can be considered as only required to alter the transmitted (or reflected) light of the given object being imaged. Since many combinations of illumination configuration and object can produce the same transmitted (or reflected) wavefront, we can consider the use of specialized illumination as a means of altering the object's imaging characteristics when the object itself cannot be altered. The illuminated object that is being imaged is imaged through optics that have been modified to enhance the type of wavefront that the specialized illumination system is providing. Only changes in the objective mask necessitate changes in the optics or processing with Wavefront Coding.

Apparatus for increasing depth of field in a conventional Amplitude Contrast Imaging system having an illumination source, illumination optics, and an illumination mask placed before a Phase Object to be imaged, and an objective mask and objective optics after the Phase Object to form an image at a detector, comprises an optical Wavefront Coding mask placed between the Phase Object and the detector, the mask being constructed and arranged to alter the optical transfer function of the Amplitude Contrast Imaging system in such a way that the altered optical transfer function is substantially insensitive to the distance between the Phase Object and the objective optics over a greater range of object distances than was provided by the unaltered optical transfer function, wherein the mask affects the alteration to the optical transfer function substantially by affecting the phase of light transmitted by the mask, and a post processing element for processing the image captured by the detector by reversing the alteration of the optical transfer function accomplished by the mask.

For example, the illumination mask and the objective mask could be constructed and arranged for Hoffman modulation Contrast Imaging, or for Carl Zeiss VAREL Contrast Imaging.

DETAILED DESCRIPTION OF THE PREFERRED EMBODIMENTS

Figure 4:
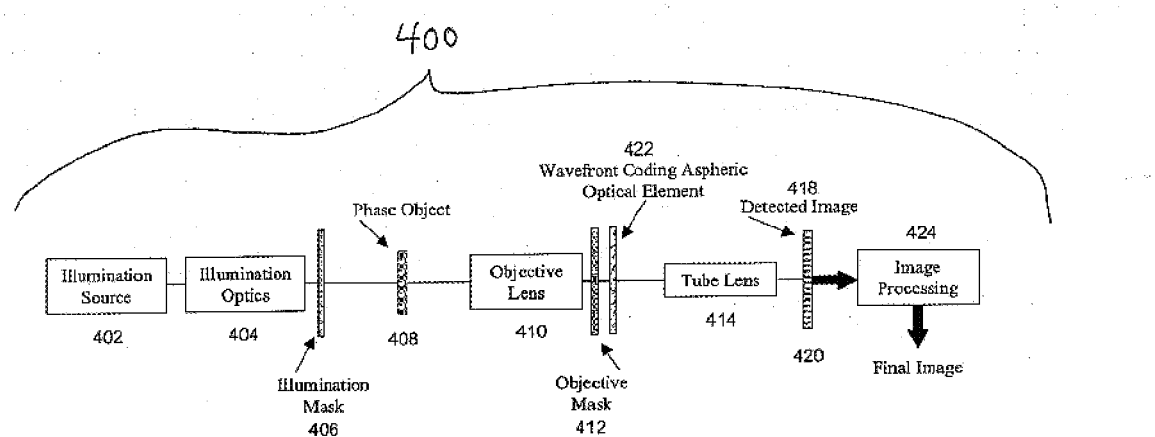
FIG. 4 shows an Extended Depth of Field (EDF) Amplitude Contrast imaging system including Wavefront Coding and post processing in accordance with the present invention.

Wavefront Coding can be combined with traditional objectives and objective masks in Amplitude Contrast systems, as shown in FIG. 4, to achieve an increased depth of field in an optical and digital imaging system. This can be explained through inspection of the ambiguity functions and modulation transfer functions (MTFs) of the related traditional, amplitude contrast systems, and Wavefront Coded imaging systems, as shown in FIGS. 5-9. FIG. 10 shows a real world image taken with a system having only Amplitude Contrast, compared to a system combining Amplitude Contrast and Wavefront Coding and post processing.

Figure 1:
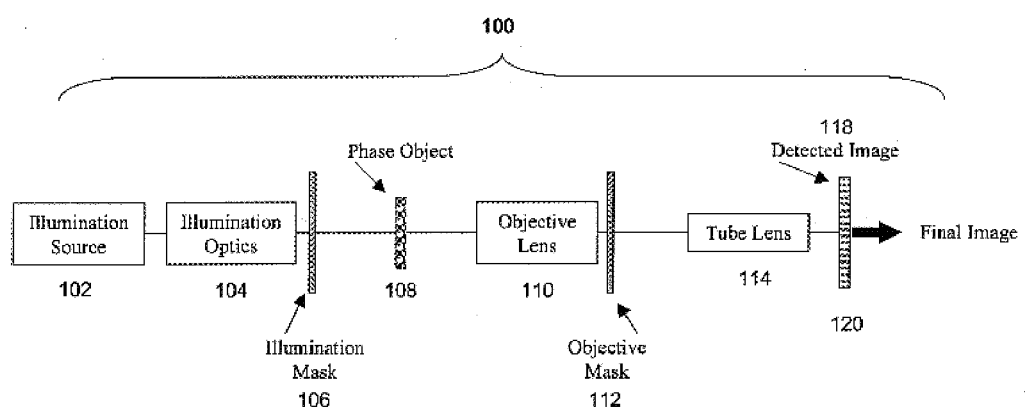
FIG. 1 (prior art) shows a standard prior art Amplitude Contrast imaging system.

FIG. 4 shows a combined Extended Depth of Field (EDF) and Amplitude Contrast Imaging system 400 including Wavefront Coding and post processing in accordance with the present invention. The general Amplitude Contrast imaging system of FIG. 1 is modified with a special purpose generalized aspheric optical element 422 and image processing 424 of the detected image to form the final image. Unlike the traditional imaging system, the final image in combined system 400 is not directly available at image plane 418. Post processing 424 of the detected image is required, to remove the Wavefront Coding effects (other than the extended depth of field). Wavefront Coding optical element 422 can be fabricated as a separate component as shown in FIG. 4, can be combined with objective mask 412, or can be constructed as an integral component of imaging objective 410 or tube lens 414.

Wavefront Coding optical element 422 can also be used on the illumination side of system in order to extend the depth of field of the projected illumination due to the duality of projection and imaging. This projected illumination would be broader than without Wavefront Coding, but the optical density as a function of distance from the object would be less sensitive with Wavefront Coding than without. In other words, the illumination would not focus on a single plane as with conventional illumination, but the density of photons is less sensitive to position than without wavefront coding.

The component of importance in combined Wavefront Coding/Amplitude Contrast systems 400 is objective mask 412, as opposed to illumination mask 406. Illumination mask 406 can be considered as only required to alter the transmitted (or reflected) light off object 408. Only changes in objective mask 412 necessitate changes in Wavefront Coding element 422 or Image Processing 424. For example, consider illumination masks 106a of FIG. 2 and 106b of FIG. 3. Changing the effective slit area of illumination mask 106a with an adjustable polarizer, or rotating illumination mask 106b, would require no changes in either Wavefront Coding element 422 or post processing 424 of a combined Wavefront Coding amplitude contrast system.

Similar reference numbers are used in FIG. 4 as are used in FIG. 1, since the systems are very similar, except for the addition of Wavefront Coding element 422 and post processing 424.

Figure 5:
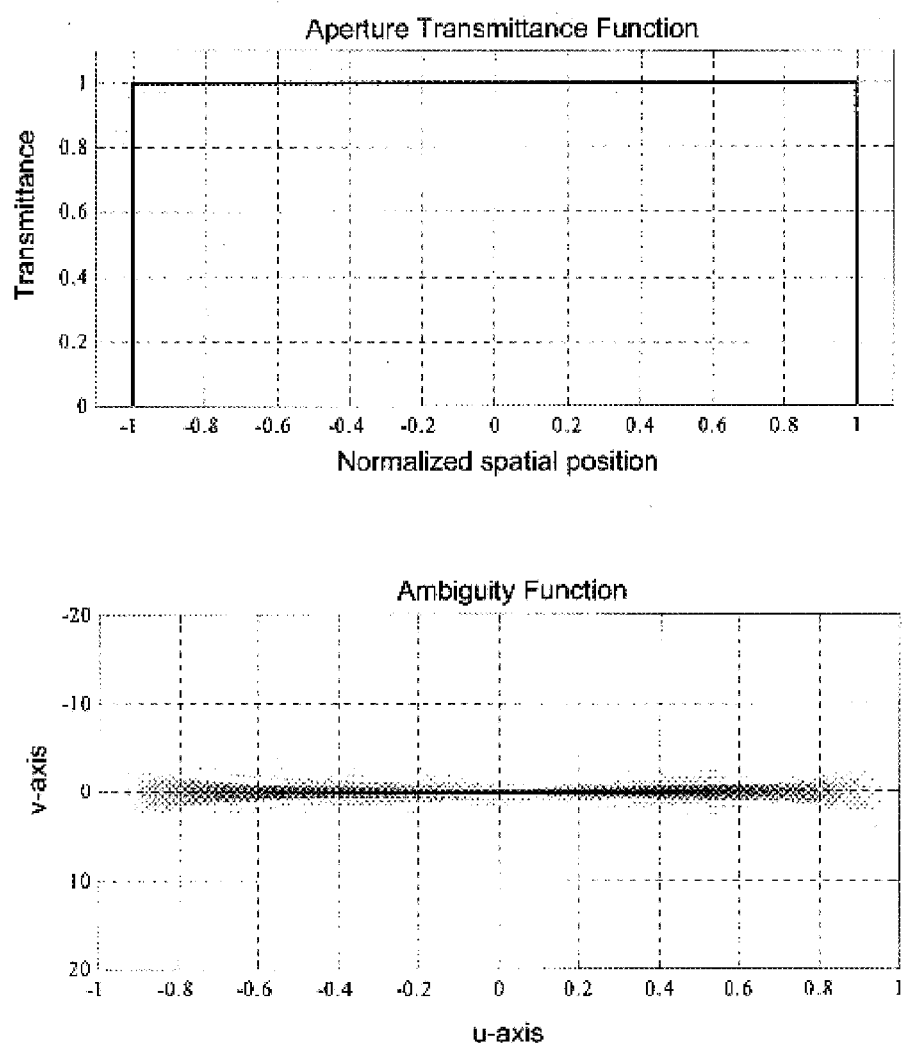
FIG. 5 shows the amplitude transmittance function and the corresponding ambiguity function for the prior art system of FIG. 1 without an objective mask.

FIG. 5 shows the amplitude transmittance function and the corresponding ambiguity function for the prior art system of FIG. 1, without Amplitude Contrast modifications. Only the magnitude of the ambiguity functions in this and following figures are shown. Ambiguity functions are, in general, complex functions. One-dimensional systems are given for simplicity. Those skilled in the art of linear systems and ambiguity function analysis can quickly make extensions to two-dimensional systems. An ambiguity function representation of the optical system is a powerful tool that allows MTFs to be inspected for all values of misfocus at the same time. Essentially, the ambiguity function representation of a given optical system is similar to a polar plot of the MTF as a function of misfocus. The in-focus MTF is described by the trace along the horizontal axis of the ambiguity function. An MTF with normalized misfocus value of $\psi = 2\pi\lambda W20$, where W20 is the traditional misfocus aberration coefficient and $\lambda$ is the illumination center wavelength, is described in the ambiguity function along the radial line with slope equal to $(\psi/\pi)$. For more information on ambiguity function properties and their use in Wavefront Coding see "Extended Depth of Field Through Wavefront Coding", E. R. Dowski and W. T. Cathey, Applied Optics, vol. 34, no 11, pp. 1859–1866, April, 1995, and references contained therein.

Returning to FIG. 5, the top plot shows the aperture transmittance function of a conventional system such as that shown in FIG. 1, without either an illumination mask 106 or an objective mask 112. In other words, FIG. 5 applies to a conventional imaging system without Amplitude Contrast modifications. The bottom plot shows the associated ambiguity function.

Over the normalized aperture (in normalized coordinates extending from −1 to +1) the ideal system has a transmittance of 1, i.e. 100%. The phase variation (not shown) is equal to zero over this range. The corresponding ambiguity function has concentrations of optical power (shown as dark shades) very close to the horizontal v=0 axis. From the relationship between the ambiguity function and misfocused MTFs we see that the diffraction limited imaging system has a small depth of field because slight changes in misfocus lead to MTFs that are represented by radial lines with non-zero slope in the ambiguity function. These lines intersect regions of small power. In other words, ambiguity functions that are concentrated about the horizontal axis indicate systems having small depths of field.

Figure 6:
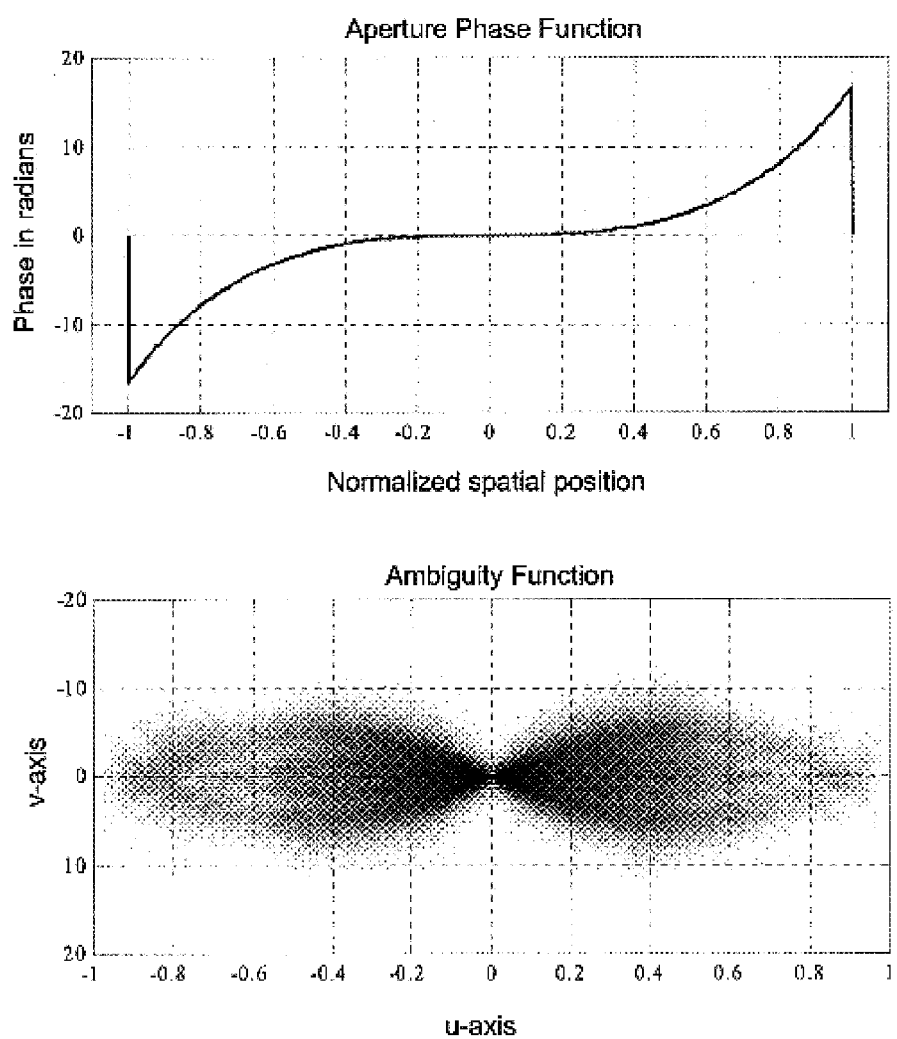
FIG. 6 shows the amplitude transmittance function and the corresponding ambiguity function for the system of FIG. 4.

FIG. 6 shows the amplitude transmittance function and the corresponding ambiguity function for the improved system of FIG. 4, but without illumination mask 406 or objective mask 412. Thus, this plot illustrates a system having Wavefront Coding, but not Amplitude Contrast Imaging. Modifying the ideal diffraction limited system associated with FIG. 5 with Wavefront Coding element 422 results in the plots of FIG. 6. As an example, the rectangularly separable complex phase function for this system is given in radians as:

$$phase(x) = \exp(j * 15 * (x^\wedge 3 + 0.1 * x^\wedge 9)),$$

$$|x| <= 1$$

$$j = \text{sqrt} - 1)$$

Increasing the peak-to-valley phase height (as can be done by increasing the constant 15 above) results in increasing depth of field. The transmittance of this system (not shown) is unity (i.e. 100%) over the entire aperture, as in the top plot of FIG. 5.

Other more general rectangularly separable forms of the Wavefront Coding complex phase is given by:

$$\text{phase}(x,y) = \exp(j * [\Sigma a_i \text{sign}(x)|x|^{b_i} + c_i \text{sign}(y)|y|^{d_i}])$$

where the sum is over the index i. Sign(x)=−1 for x<0, +1 for x≧0.

Rectangularly separable Wavefront Coding forms allow fast processing. Other forms of Wavefront Coding complex phases are non-separable, and the sum of rectangularly separable forms. One non-separable form is defined as:

$$\text{phase}(r,\theta) = \exp(j * [\Sigma r^{a_i} \cos(b_i \theta + \phi_i)])$$

where the sum is again over the subscript i.

The ambiguity function shown in FIG. 6 for this Wavefront Coded system is seen to have optical power spread over a much larger region in the ambiguity domain than does the diffraction-limited system plotted in FIG. 5. Broader regions of optical power in the ambiguity function translate to larger depth of field or depth of focus since the ambiguity function is essentially a radial plot of misfocused MTFs with the angular dimension pertaining to misfocus.

Figure 2:
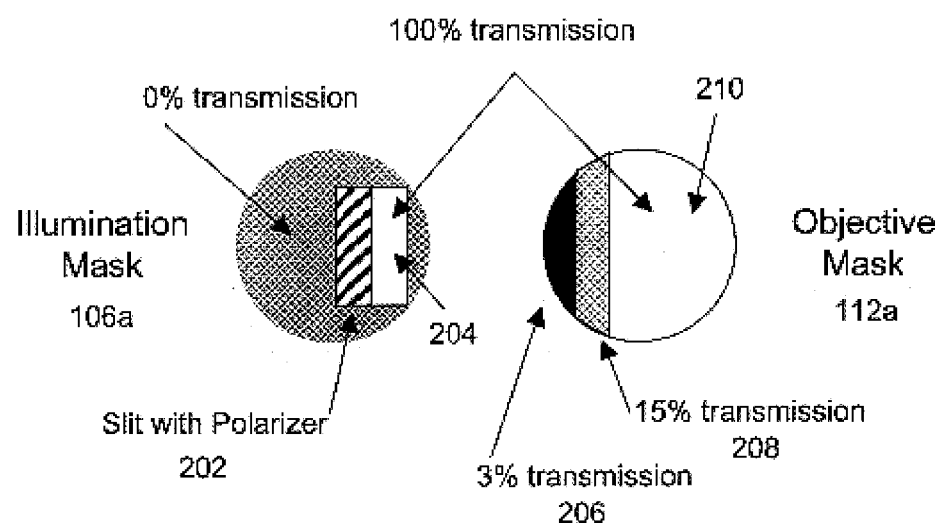
FIG. 2 (prior art) shows an illumination mask and a transmission mask for use in the Amplitude Contrast imaging system of Figure, implementing Hoffman modulation contrast.
Figure 3:
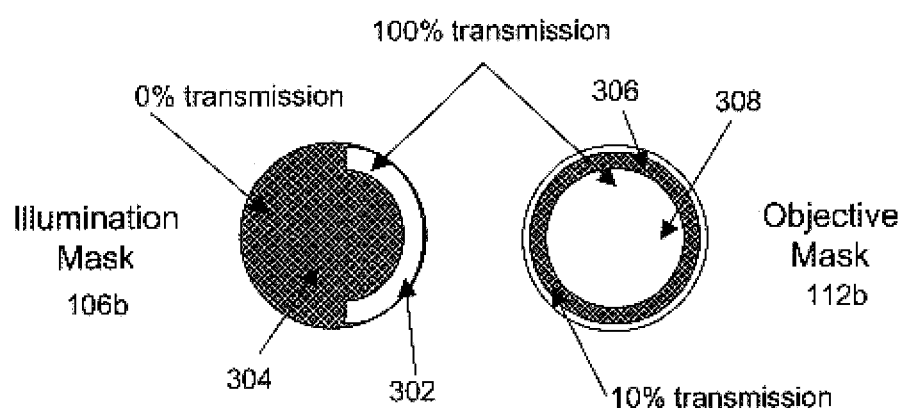
FIG. 3 (prior art) shows an illumination mask and a transmission mask for use in the Amplitude Contrast imaging system of Figure, implementing Carl Zeiss VAREL contrast imaging.
Figure 7:
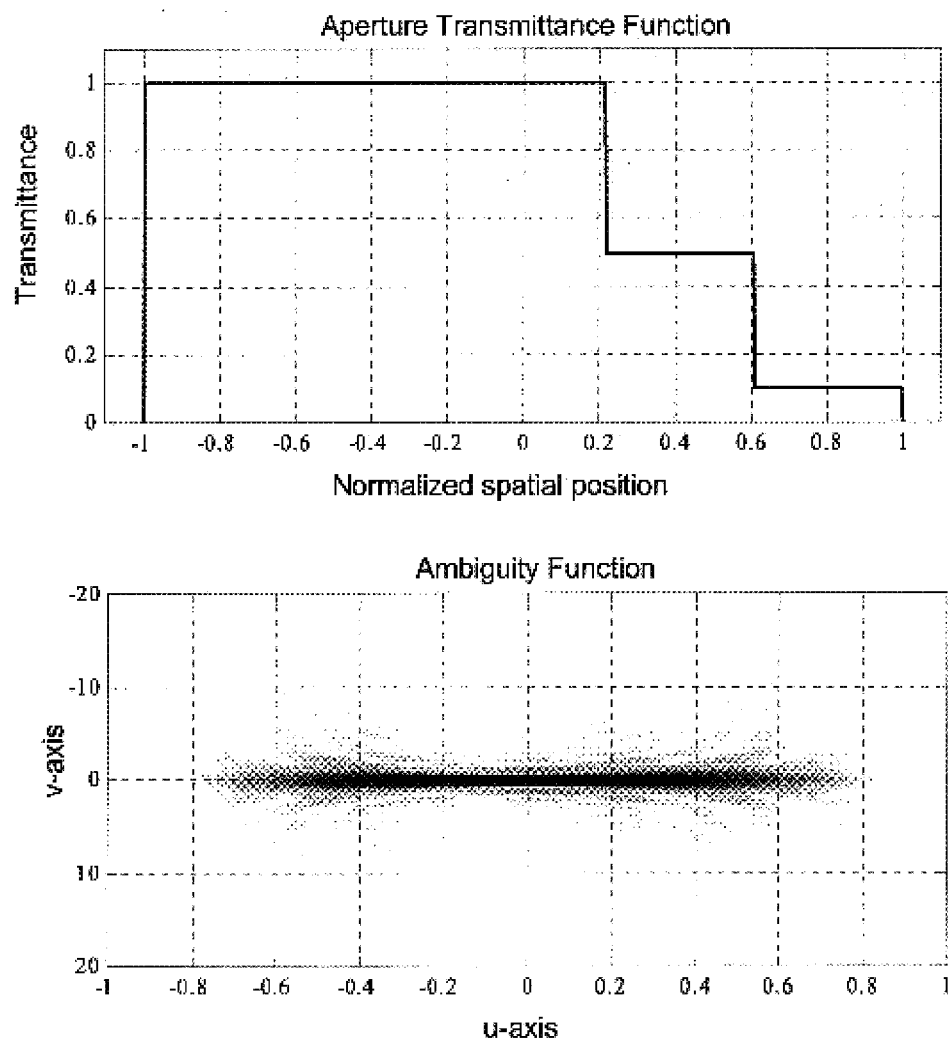
FIG. 7 shows the amplitude transmittance function and the corresponding ambiguity function for the prior art system of FIG. 1, using Hoffman modulation contrast masks.

FIG. 7 shows the amplitude transmittance function and the corresponding ambiguity function for the prior art system of FIG. 1, using Hoffman modulation contrast masks as shown in FIG. 2. Thus, these plots illustrate a system having Amplitude Contrast Imaging, but not Wavefront Coding. Again, a one-dimensional example is shown. The transmittance for this system, seen in the upper plot, is 1 for 80% of the aperture, 0.5 transmittance for 10% near the end of the aperture, and 0.1 transmittance for the final 10% of the aperture. The phase variation of the system (not shown) is again considered to be equal to zero over the entire aperture.

The corresponding ambiguity function for this amplitude contrast system in the lower plot is seen to differ from the diffraction-limited system plotted in FIG. 5. The extent of the optical power in the present example along the v=0 axis is reduced compared to that of the diffraction limited system plotted in FIG. 5, and the optical power near the v=0 axis is slightly broader. Both differences are due to the severe reduction of transmittance or optical power near the edge of the aperture of the amplitude contrast systems. This reduction of the optical power at the aperture reduces the extent of the corresponding MTFs (thereby also reducing spatial resolution) and slightly increases the depth of field. These effects are well known by those in the field. Similar reductions of resolution and increases in depth of field are accomplished by the more common method of stopping down the aperture with an iris in a traditional imaging system.

Figure 8:
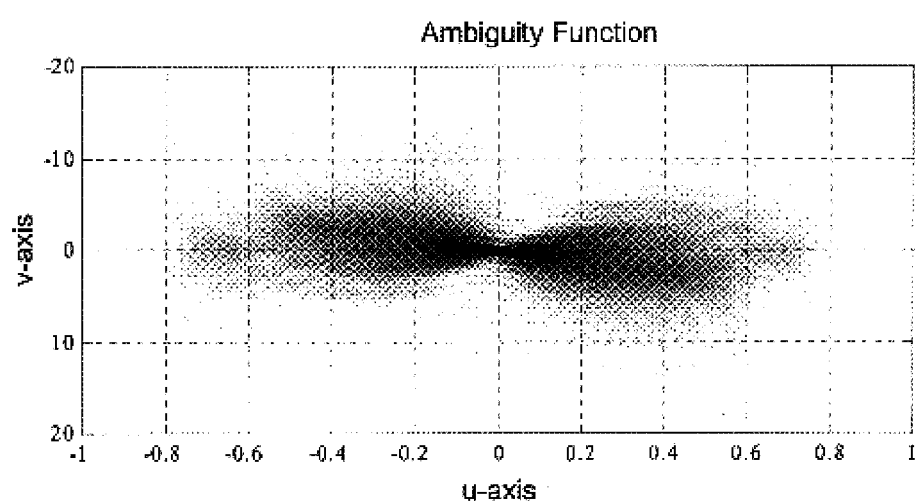
FIG. 8 shows the ambiguity function for the system of FIG. 4, using Hoffman modulation contrast masks.

FIG. 8 shows the ambiguity function for the improved system of FIG. 4, using Hoffman modulation contrast masks, as shown in FIG. 2. Thus, the combination of Amplitude Contrast Imaging and Wavefront Coding systems is illustrated in FIG. 8. The phase is as shown in FIG. 6, while the transmittance is as shown in FIG. 7.

A misfocus bias equal to $\psi=-10$ was removed from the combined system (incorporating Wavefront Coding and Amplitude Contrast Imaging). The combined system ambiguity function is seen to have more optical power spread about the horizontal axis when compared to either the Amplitude Contrast system plotted in FIG. 7 or the diffraction limited system plotted in FIG. 5.

MTFs for combined Wavefront Coding and Amplitude Contrast Imaging systems will change much less as a function of misfocus than will the MTF's of Amplitude Contrast systems alone. Thus, the combined systems have extended depth of field.

Figure 9:
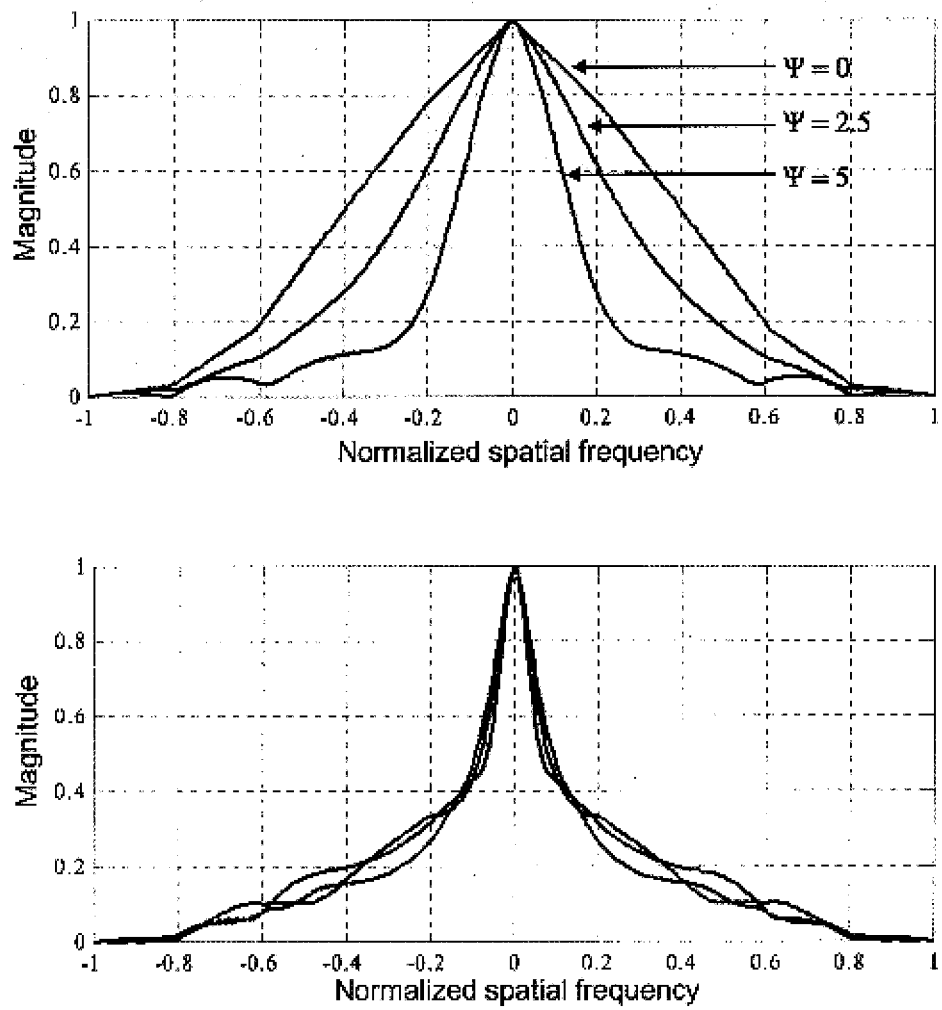
FIG. 9 shows modulation transfer functions (MTFs) associated with the system of FIGS. 1 and 7, and with the system of FIGS. 4 and 8, both using Hoffman modulation contrast.
Figure 10:
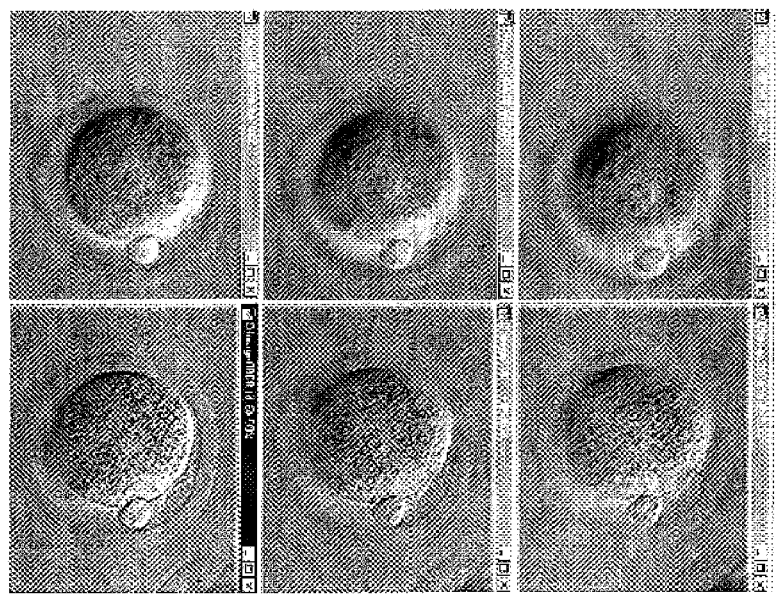
FIG. 10 is an image of a one cell mouse embryo with a conventional 40X Hoffman modulation contrast system similar to that of FIG. 1, and with a wavefront encoding 40X Hoffman modulation contrast system similar to that of FIG. 4.

FIG. 9 shows modulation transfer functions (MTF) associated with an Amplitude Contrast Imaging system (specifically the prior art system of FIG. 1, using Hoffman modulation contrast as in FIG. 2), and with a combined Wavefront Coding and Amplitude Contrast Imaging system (the system of FIG. 4, using Hoffman modulation contrast as in FIG. 2.

The top plot shows the MTFs of the Amplitude Contrast Imaging system. The bottom plot shows the MTFs of the combined Wavefront Coding and Amplitude Contrast Imaging system. These plots are the particular MTFs given in the respective ambiguity functions for the normalized misfocus values $\psi=\{0, 2.5, 5\}$. Notice that the MTFs for the Amplitude Contrast system (top plot) vary appreciably with even this slight amount of misfocus. The image will thus change drastically due to misfocus effects in the Amplitude Contrast system for only small, normalized misfocus values. This is expected from the ambiguity function associated with this system (shown in FIG. 7).

By comparison, the MTFs from the combined Wavefront Coded and Amplitude Contrast Imaging system (bottom plot) show very little change with misfocus as predicted by the ambiguity function associated with this system (shown in FIG. 8). If the MTFs of the system do not change, the resulting MTFs (and hence also point spread functions) can be corrected over a large range of misfocus with a single image post processing step 424. This is not possible with systems that do not have a large depth of field since the MTFs and PSFs representing the images change with misfocus to values that are unknown and often impossible in practice to calculate.

Notice that the MTFs from the combined Wavefront Coding Amplitude Contrast system of FIG. 8 (lower plot) essentially do not change with misfocus but also do not have the same shape as that of the in-focus MTF ($\psi=0$) of the Amplitude Contrast system alone in the top plot of FIG. 8.

In the spatial domain this is the same as forming images with a specialized blur where the blur is insensitive to the amount of misfocus. The Image Processing function 424 of FIG. 4 is used to remove this blur. The Image Processing function is designed so that the MTFs and PSFs of the combined Wavefront Coding Amplitude Contrast system over a range of misfocus after processing closely match that of the in-focus Amplitude Contrast system(this can be done because all of the MTFs are essentially the same). If desired, the Image Processing function can also produce an effective MTF after processing that has more or less contrast than the in-focus Amplitude Contrast system depending on the needs of the particular application.

There are many linear and non-linear prior art techniques for removing specialized blur in images. Computationally effective techniques include rectangularly separable or multi-rank linear filtering. Rectangularly separable linear filtering involves a two step process where the set of one-dimensional columns are filtered with a one dimensional column filter and an intermediate image is formed. Filtering the set of one-dimensional rows of this intermediate image with a one-dimensional row filter produces the final image. Multi-rank filtering is essentially the parallel combination of more than one rectangularly separable filtering operation. A rank N, digital filter kernel can be implemented with rectangularly separable filtering by using N rectangularly separable filters in parallel.

The form of the processing (rectangularly separable, multi-rank, 2D kernel, etc.) is matched to that of the Wavefront Coding element. Rectangularly separable filtering requires a rectangularly separable Wavefront Coding element. The element described in FIG. 6 is rectangularly separable.

FIG. 10 is an image of a one cell mouse embryo with a conventional 40X Hoffman modulation contrast system similar to that of FIG. 1, and with a Wavefront Coding 40X Hoffman modulation contrast system similar to that of FIG. 4.

FIG. 10 shows comparison images of imaging a one-cell mouse embryo with a conventional 40X Hoffman Modulation Contrast system (refer to FIGS. 1 and 2), and a combined Wavefront Coding/40X Hoffman Modulation Contrast system (refer to FIGS. 4 and 2). The top set of images was produced by the conventional 40X Hoffman Modulation Contrast system. The bottom set of images was produced by the combined Wavefront Coding/40X Hoffman Modulation Contrast system.

Comparing the images from left to right, object distance was varied by six microns further from the objective for each image compared to the image on its left. The bottom row combined Wavefront Coding/40X Hoffman Modulation Contrast images are the final images produced after image processing of the detected image. Rectangularly separable digital filtering was used in the post processing step.

Notice the differential shading visible on the top row (40X Hoffman Modulation Contrast) images. This is a characteristic of Hoffman imaging. Notice also that many parts of the Hoffman images are blurred due to misfocus effects. The characteristic Hoffman shading and extended depth of field are both seen in the Wavefront Coding images.

What is claimed is:

1. Apparatus for increasing depth of field in a conventional Amplitude Contrast Imaging system having an illumination source, illumination optics, and an illumination mask placed before a Phase Object to be imaged, and an objective mask and objective optics after the Phase Object to form an image at a detector, the improvement comprising:

an optical Wavefront Coding mask placed between the Phase Object and the detector to modify the wavefront of transmitted light, said coding mask being constructed and arranged to alter the optical transfer function of the Amplitude Contrast Imaging system in such a way that the altered optical transfer function is substantially insensitive to the distance between the Phase Object and the objective optics over a greater range of object distances than was provided by the unaltered optical transfer function, wherein the coding mask affects the alteration to the optical transfer function substantially by affecting the phase of light transmitted by the coding mask; and a post processing element for processing the image captured by the detector by reversing the alteration of the optical transfer function accomplished by the coding mask.

2. The apparatus of claim 1 wherein the illumination mask and the objective mask are constructed and arranged for Hoffman modulation Contrast Imaging.

3. The apparatus of claim 1 wherein the illumination mask and the objective mask are constructed and arranged for Carl Zeiss VAREL Contrast Imaging.

4. The apparatus of claim 1 wherein the detector is a charge coupled device (CCD).

5. The method for increasing depth of field in a conventional Amplitude Contrast Imaging system having an illumination source, illumination optics, and an illumination mask placed before a Phase Object to be imaged, and an objective mask and objective optics after the Phase Object to form an image at a detector, wherein the improvement comprising the steps of:

between the Phase Object and the detector, modifying the wavefront of transmitted light with a wavefront coding mask;

the wavefront modification selected to alter the optical transfer function of the Amplitude Contrast Imaging system in such a way that the altered optical transfer function is substantially insensitive to the distance between the Phase Object and the objective optics over a greater range of object distances than was provided by the unaltered optical transfer function; and post processing the image captured by the detector by reversing the alteration of the optical transfer function accomplished by the coding mask.

* * * * *

UNITED STATES PATENT AND TRADEMARK OFFICE
CERTIFICATE OF CORRECTION

PATENT NO. : 6,873,733 B2
DATED : March 29, 2005
INVENTOR(S) : Edward Raymond Dowski, Jr.

It is certified that error appears in the above-identified patent and that said Letters Patent is hereby corrected as shown below:

Column 6,
Line 23, "$j$=sqrt-1)" should read -- $j$=sqrt(-1) --.

Signed and Sealed this

Seventh Day of February, 2006

JON W. DUDAS
*Director of the United States Patent and Trademark Office*